May 23, 1933.    T. A. KEEN    1,910,252
DOG STARTING APPARATUS
Filed May 13, 1931    2 Sheets-Sheet 1
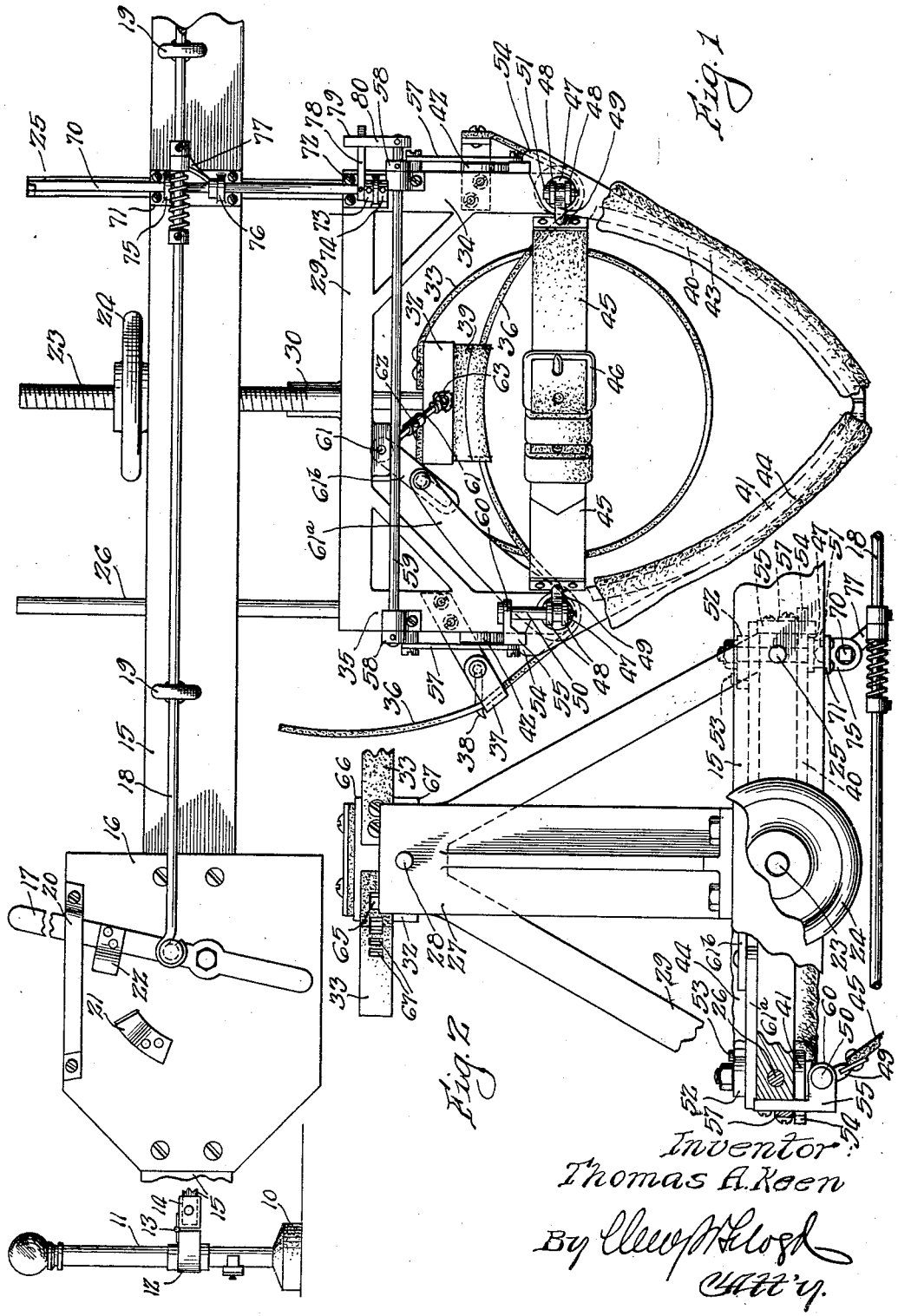
Inventor
Thomas A. Keen May 23, 1933.　　　T. A. KEEN　　　1,910,252
DOG STARTING APPARATUS
Filed May 13, 1931　　　2 Sheets-Sheet 2

Inventor:
Thomas A. Keen
By Clency W. Wood
Att'y

Patented May 23, 1933

1,910,252

UNITED STATES PATENT OFFICE

THOMAS A. KEEN, OF ST. LOUIS, MISSOURI, ASSIGNOR TO HANNAH M. SMITH, OF RIVER FOREST, ILLINOIS

DOG STARTING APPARATUS

Application filed May 13, 1931. Serial No. 537,025.

The present invention relates to dog racing and has to do particularly with an improved dog starting apparatus in which the dog starting members are arranged upon a lineal member transversely of a track.

One object of the present invention is to provide in a dog starting apparatus a certainty of conjoint release of all dog holding parts.

Other objects of the invention include a new and improved type of dog holding jaw, new and improved means for holding a dog at its front, improved means for adjusting a holding apparatus to the size of a dog, improved latch means for the holding parts, and improved release means for said latch means.

These objects, and such other objects as may hereinafter appear, are obtained by the novel construction, unique arrangement, and improved combination of the several elements which constitute the invention, one embodiment of which is illustrated in the accompanying drawings, in which:

Figure 1 is a front view of a dog starting apparatus including the present invention;

Figure 2 is a top view of an apparatus such as is shown in Figure 1;

Like reference characters are used to designate similar parts in the drawings and in the description of the invention which follows.

Figures 3, 4, 5:
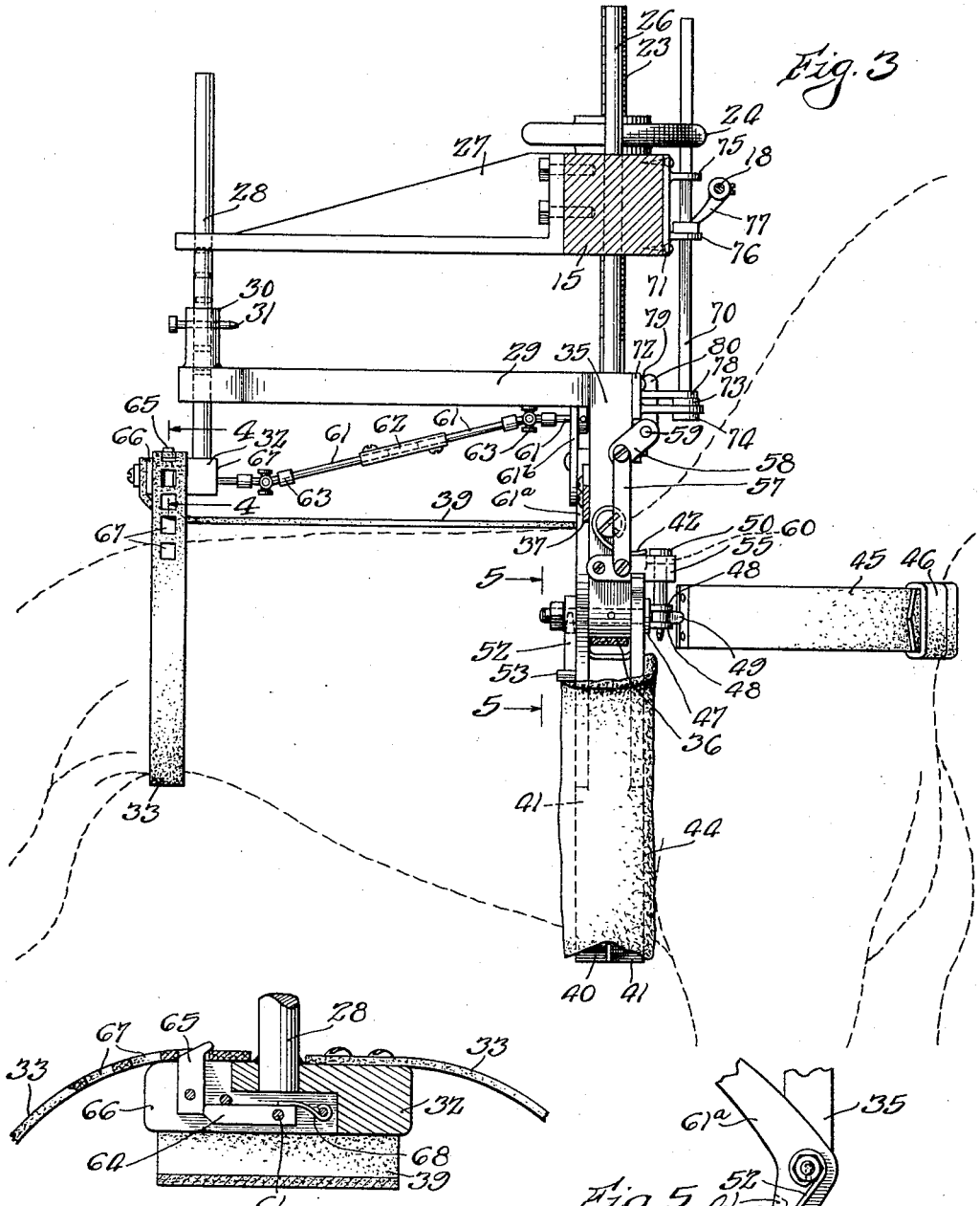
Figure 3 is a side elevation of the device shown in Figures 1 and 2.
Figure 4 is a transverse sectional detail taken on the line 4—4 of Figure 3.
Figure 5 is a sectional detail on the line 5—5 of Figure 3.

At the side of a track, anchored in a concrete pier 10, there may be an upright 11 which is provided with a bracket 12. Upon said bracket 12 is a hinge 13, the free end of which hinge secures a socket 14. A lineal member 15 is adapted to be slidingly disposed and locked in said socket 14, and upon said lineal member 15 is a plurality of dog holding members adapted to be released simultaneously to start dogs in a race.

In juxtaposition to that part of the lineal member 15 which is adapted to be inserted into said socket 14 is a plate 16. A lever 17 is pivoted to said plate 16 and pivoted to said lever 17 is a release rod 18 which is suitably guided by bearing brackets 19 for said lineal member 15, said release rod 18 concurrently acting upon all dog holders.

There may also be associated with said lever 17 upon said plate 16, guide means 20 for preventing the movement of the lever 17 beyond fixed limitations. Likewise, there may be a contact 21 insulated from said plate 16 and a contact 22 insulated from said lever 17, which contacts are adapted to be brought together when said lever 17 is actuated to move said release rod 18 to start a dog race by releasing simultaneously all of the dog holding members on lineal member 15. The two contacts 21 and 22 are connected in a branch of an electric circuit for starting a time clock. As those contacts are brought together, incident to releasing the dogs from the device, the electric circuit is effectively closed.

Through said lineal member 15 are a plurality of apertures. For holding each dog starting apparatus three apertures are required through lineal member 15 which is square in cross section.

Through the central hole of each group of three apertures is a height adjusting member which comprises a threaded member 23 about which a hand wheel 24 is adapted to rotate. In the apertures at each side of the adjusting member 23 are rodlike guide members 25 and 26.

At the rear of said adjusting rod 23, in association with each dog starting instrumentality is a bracket 27. Through said bracket 27 is also a slidingly adjustable guide rod 28.

Beneath said device and supported by said vertical adjusting member 23 and guided by said guide members 25, 26 and 28 is a triangular member 29. Intermediate said triangular member 29 and said bracket member 27 is a boss 30 disposed on member 29 through which a pin 31 is adapted to be inserted. Said pin 31 is adapted to be projected through the rear guide rod 28, which rear guide rod 28 has a cross part 32 which supports a strap 33 which is adapted to be used about the rear portion of the dog's body, there being in said cross member 32 secured to said rod 28 and to which said strap 33 is secured, latch means for the unsecured end of the latter.

Depending from each of the corners of the front section of said triangular member 29, are downwardly extending legs 34 and 35 between which a dog is adapted to be secured. Upon said legs 34 and 35, is a transverse strap 36 which is anchored at one side (34) and which at the other side (35) is adapted to be passed over a suitable bearing face and through a buckle 37, the pin 38 of which buckle determines the adjustment of said strap member 36. The adjustment of the strap 36 is to be regulated according to the height of a dog.

Secured to said strap 36 by being looped thereabout is a broad strap band 39 which is adapted to rest upon or above a dog's back and which extends rearwardly of the device to be secured to the under portion of the latch member housing 32 at the rear of the device. The broad strap 39 prevents a dog from coming into contact at its back with the apparatus heretofore described.

Also attached to said legs 34 and 35 at the front of said triangular member 29 are two pivoted jaws 40 and 41 which are supplied with a spring 52 to normally urge them outwardly. Said jaws may be of metal or other suitable material and are covered with lambs wool or other padding material 43 and 44 so that they will not in any way injure a dog.

Pivotally secured to one of said legs (34) is one end of a front strap 45 for a dog. Strap 45 comprises two sections joined together by a buckle 46 to provide adjustment. The other end of said dog engaging strap 45 is releasably secured at the front section of the other leg (35). Brackets 47 for said strap 45 comprise two parallel members 48 between which are adapted to be inserted eye bolts 49 secured to either end of the strap 45.

For the bracket secured to the member 35 there is a plunger 50 adapted to reciprocate in respect to said parallel members 48 the end of said plunger 50 being adapted, when in its lowermost position, to project through said members and through the eye bolt 49 therebetween to secure the strap 45 against displacement. For release, said plunger 50 is moved upwardly in a manner shortly to be described.

A machine bolt 51 is used at the opposite end of the strap 45 for engaging the eye 49 and the parallel member 48 it being unnecessary to release said strap at both ends.

The jaws 40 and 41 which are pivoted to said legs 34 and 35 are each adapted to be urged apart by a flat spring 52 which is suitably anchored upon the proper leg, the free end of which spring is adapted to engage a bearing or camming pin 53 upon each of said jaws. The ends of these jaws 40 and 41 are each provided with rounded portions 54 which are adapted to cam a latch 55 disposed at the side of each of the legs 45 and 35, the rounded portions terminating in shoulders 54a. The latch 55 is adapted to be impingingly urged behind the shoulders 54a at the top of said jaws 40 and 41 by means of leaf spring 42 to hold said jaws in a closed position with a dog therebetween and with the springs 52 urging the jaws outwardly.

Release of the jaws 40 and 41 is had by lifting the latch 55. Such lifting is had by links 57 which are secured to arms 58, which arms are keyed to an operating rod 59 traversing the front of each dog holding member just above the straps which hold the shoulders of the dog. The releasing member 60 for said front strap is secured to the latch 55 and is lifted by means of links 57. The jaws 40 and 41 and the front strap therefore are adapted to be released conjointly and simultaneously.

The latch means are reversed in arrangement and position at each side of the device. From the left hand releasing member (Figure 1), there extends rearwardly a rod 61 having means 62 for adjustment and a universal joint 63 therein. To actuate rod 61, an arm 61a secured to jaw 41 cams a second such arm 61b secured to rod 61, there being a sliding connection comprising a slot and pin therebetween.

Said rod 61 is adapted to provide release for a trigger 64 holding a pivoted hook member 65 in the transverse rear member 32. Said hook member 65 is pivoted between the sides 66 and 67 of said rear member 32 and projects above the top thereof.

The strap 33 is secured to the other end of said member 32 and is adapted to extend under a dog and be drawn about its body to engage in the hook member 65, there being suitable apertures 67 such as the square apertures shown in said strap 33 adapted to be slipped over the end of said hook 65.

The trigger 64 in said device is actuated by a spring 68 to normally engage said hook member 65 to maintain it in a locked position, and the rod 61 extends rearwardly to release said trigger 64 at the proper time and simultaneously with the release of the front strap member and the jaws 40 and 41.

A square rod 70 is vertically disposed at the front of lineal member 15 and is adapted to rotate within brackets 71 and 72. One of said brackets 72 is on the right hand leg (Figure 1) of said triangular member 29. Secured thereto are suitable collars 73 and 74 respectively above and below said bracket 72 to prevent the longitudinal movement of said square member 70 relatively to said dog holding frame. The bracket 71 comprises bearing parts 75 and 76 and is disposed upon said lineal member 15.

Intermediate the bearing parts on said bracket 71 a link 77 is secured to said square member 70. The other end of link 77 engages the release rod 18 by means of an oblong aperture in said end, providing that said link may be displaced angularly to the linear axis of said rod. The aperture in the end of the link 77 may be of a vertical dimension, or width, equal to the diameter of the release rod 18, but the horizontal dimension of the said aperture must be greater than the diameter of rod 18 so that there will be freedom of movement between the two members when they are in an angular position other than normal to one another. The back end of such oblong aperture will be adjacent to rod 18 when the rod 18 and the arm 77 are normal to one another, and as the arm 77 is turned, the sides of the aperture will slide along the rod until the opposite end of the aperture comes in contact therewith. Movement of the release rod 18 in either direction causes said square rod 70 to rotate on a vertical axis. There is an arm 78 at the lower end of rod 70 which is adapted to engage a camming surface 79 and an arm 80 in association with said transverse latch-releasing rod 59.

Movement of said square rod 70 on its axis causes arm 78 to move said latch release rod 59, whereupon the latches at each side of the apparatus disengage the jaws 40 and 41 whereupon said jaws spring outwardly to release a dog. Concurrently, the latch at the left-hand side of Figure 1 releases the front strap and the dog may move without regard thereto. Simultaneously, the rod connected to the rear strap latch is turned, said rod moving the trigger in said rear transverse member to permit of the hook holding the rear strap becoming disengaged therefrom, and releasing the rear strap. All of the releases occur simultaneously.

The result is that with the movement of the release lever 17, all of the parts which are adapted to hold the dogs, are conjointly released and all of the dogs obtain an even start. The rod 18 extends as an integral structure to all of the dog holding parts.

Many adjustments are provided in the present apparatus. The hand wheel may be used to adjust the height of the apparatus in relation to a dog. The dogs which are used in greyhound racing are far from being uniform in size. Frequently, however, it is unnecessary to use said hand wheel. Certain adjustments may be obtained by manipulation of the strap which extends over the top of the dog at its shoulders.

The jaws being deeply padded with lambs wool adjust themselves to the dog but any lack of adjustment may be compensated for by said over-the-back strap. The front strap which prevents the dog from pulling out of the harness is also adjustable to provide a proper fitting of the apparatus to the contour of a dog. The rear strap is adjustable by having a great plurality of apertures therein, but is further adjustable in that the holder therefor is adapted to be moved up and down to provide proper height of the device for the dog's rearquarters.

All of these adjustments may be made without interfering with the actuating means. The square rod 70 which is actuated by the release rod 18 is adapted to slide through the link or lever 77 which actuates it and irrespective of the height of the dog holding frame, said rod 70 being adapted to maintain an operable position and respond to the same operating force, a pull on rod 18, in any position which the frames may assume.

The rear strap 33 is especially provided for dogs new at racing or unruly and is intended to keep such dogs in alignment with the other dogs in the race. Most dogs, after a second or third race, are intelligent and tractable enough to remain in proper alignment at the starting post under which circumstances the rear strap 33 is not necessary.

I claim:

1. Dog starting apparatus comprising a lineal member, a frame thereon and adjustable vertically thereto, dog holding members in said frame, release means for said dog holding means, actuating means on said lineal member, and a torsional connecting member between said actuating means and adapted to operate irrespective of the vertical position of said frame.

2. Dog starting apparatus comprising a lineal member, a frame thereon and adjustable vertically thereto, dog holding members on said frame, release means for said holding members and movable with said frame, an actuating member on said lineal member, and a torsional connecting member fixedly connected to said release means and slidably connected to said actuating member.

3. Dog starting apparatus comprising a lineal member, a frame thereon and movable in a direction normal thereto, dog holding members on said frame, release means for said holding members, an actuating rod movable longitudinally of said lineal member, and a connecting member intermediate said actuating rod and said release means and having a sliding connection with said rod.

4. Dog starting apparatus comprising a lineal member, a frame thereon, dog holding members on said frame, a release for said holding members, and an actuating rod for said release, said rod being normal to said release and parallel to said lineal member and a rod arranged normally to said actuating rod operatively connecting said release to said actuating rod, said actuating rod being adapted to impart a rotative movement to said connecting rod.

5. Dog starting apparatus having a lineal member, a frame thereon and adjustable in a direction normal thereto, dog holding members on said frame, a release means for said holding members and comprising a shaft, and an actuating means for said shaft movable longitudinally of said lineal member thereby imparting a rotative movement to said release means.

6. Dog starting apparatus having a lineal member, a frame thereon, dog holding members on said frame, release means for said holding member comprising a shaft normal to said lineal member, and means on said lineal member for rotating said shaft.

7. Dog starting apparatus comprising a lineal member, a frame thereon and adjustable normally to said lineal member, dog holding members on said frame, release means for said holding members comprising a rotatable shaft, and actuating means on said lineal member for rotating said shaft, there being a sliding connection between said shaft and actuating means to compensate for the movement of said frame relatively to said lineal member.

8. Dog starting apparatus comprising a lineal member, a frame thereon, dog holding members on said frame, release means for said holding members and comprising a shaft journalled for rotation in said frame and having an arm, and an actuating member slidably mounted on said lineal member and engaging said arm to rotate said shaft.

9. Dog starting apparatus comprising a lineal member, a frame adjustable normally thereto, dog holding members on said frame, a releasing shaft for said holding members and normal to said lineal member, a shaft rotating member on said lineal member and reciprocable longitudinally thereof, and a connecting link between said shaft and shaft rotating member secured to said shaft rotating member and feathered for longitudinal movement along said shaft.

10. Dog starting apparatus comprising a lineal member, a frame, dog holding members on said frame, release means for said holding members comprising a rotatable shaft journalled in said frame and in said lineal member, a reciprocable actuating member on said lineal member, and a link pivoted to said actuating member and splined to said shaft.

11. Dog starting apparatus comprising a lineal member, a frame adjustable in a direction normal to said lineal member, dog holding members on said frame, release means for said holding members comprising a rotatable shaft journalled in said frame and in said lineal member, a reciprocable actuating member on said lineal member, and a link pivoted to said actuating member and splined to said shaft to admit of movement of said shaft through said link coincidentally with movement of said frame to said lineal member.

THOMAS A. KEEN.